United States Patent
Middelberg et al.

(10) Patent No.: US 9,795,081 B2
(45) Date of Patent: Oct. 24, 2017

(54) METHOD FOR OPERATING A COMBINE HARVESTER WITH BELT DRIVE CONFIGURED TO IMPLEMENT A MEASURE TO PREVENT SLIP OF THE BELT DRIVE AND COMMUNICATE THE MEASURE TO AN OPERATOR

(71) Applicant: CLAAS SELBSTFAHRENDE ERNTEMASCHINEN GMBH, Harsewinkel (DE)

(72) Inventors: Rene Middelberg, Osnabrueck (DE); Stefan Teroerde, Warendorf (DE); Bastian Bormann, Guetersloh (DE); Thilo Krause, Glinde (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 133 days.

(21) Appl. No.: 14/834,714

(22) Filed: Aug. 25, 2015

(65) Prior Publication Data
US 2016/0066506 A1 Mar. 10, 2016

(30) Foreign Application Priority Data
Sep. 10, 2014 (DE) ........................ 10 2014 113 008

(51) Int. Cl.
*G06F 7/70* (2006.01)
*G06F 19/00* (2011.01)
(Continued)

(52) U.S. Cl.
CPC ....... *A01D 41/1274* (2013.01); *A01D 41/142* (2013.01); *A01F 12/56* (2013.01); *A01F 12/58* (2013.01)

(58) Field of Classification Search
CPC ........................... A01D 41/127; A01D 69/00; Y10T 477/6203; Y10T 477/6237
(Continued)

(56) References Cited

U.S. PATENT DOCUMENTS 4,321,991 A * 3/1982 Teijido .................. A01D 69/06
192/150
4,552,547 A * 11/1985 Carnewal ............... A01D 41/12
474/101
(Continued)

FOREIGN PATENT DOCUMENTS

| EP | 2382854 | 11/2011 |
|---|---|---|
| WO | WO 87/04894 | 8/1987 |
| WO | WO2005/102809 | 11/2005 |

*Primary Examiner* — Arpad Fabian-Kovacs
(74) *Attorney, Agent, or Firm* — Michael J. Striker (57) ABSTRACT

A method for operating a combine harvester configured with a number of working assemblies driven by at least one belt drive, and a ground drive, wherein the at least one belt drive and the ground drive are driven by a main drive comprising an engine, monitors for and accommodates slip. The working assemblies are monitored by sensors with respect to an occurrence of slip in the at least one belt drive. Signals representing slip are transmitted to a control device. The control device is connected to an input/output. The signals representing the slip are evaluated by the control device and the result is weighted. Depending on the weighting of the result, at least one measure is initiated by the control device, which results in a reduction of the slip and the at least one initiated measure is signalled by the input/output unit.

15 Claims, 4 Drawing Sheets (51) Int. Cl.
*G06G 7/00* (2006.01)
*G06G 7/76* (2006.01)
*A01D 41/127* (2006.01)
*A01F 12/56* (2006.01)
*A01F 12/58* (2006.01)
*A01D 41/14* (2006.01)

(58) Field of Classification Search
USPC .......................... 701/50; 340/684; 702/185
See application file for complete search history.

(56) References Cited

U.S. PATENT DOCUMENTS

| | | | |
|---|---|---|---|
| 5,488,817 A * | 2/1996 | Paquet | A01D 41/127 56/10.2 R |
| 5,855,108 A | 1/1999 | Salz et al. | |
| 5,978,720 A * | 11/1999 | Hieronymus | A01D 41/127 340/438 |
| 6,282,476 B1 * | 8/2001 | Hieronymus | A01D 41/127 340/684 |
| 7,658,059 B2 * | 2/2010 | Majkrzak | A01D 34/38 56/264 |
| 7,937,918 B1 * | 5/2011 | Mossman | A01D 34/8355 56/11.7 |
| 7,974,749 B2 * | 7/2011 | Zettel | B60K 25/02 123/339.15 |
| 8,340,862 B2 * | 12/2012 | Baumgarten | A01D 41/127 56/10.2 R |
| 8,527,157 B2 * | 9/2013 | Imhof | A01D 41/142 340/438 |
| 8,930,089 B2 * | 1/2015 | Reeves | A01D 41/1217 701/50 |
| 9,002,594 B2 * | 4/2015 | Wilken | G05B 11/06 56/10.1 |
| 2013/0210506 A1 * | 8/2013 | Hollatz | A01F 12/40 460/112 |

* cited by examiner

METHOD FOR OPERATING A COMBINE HARVESTER WITH BELT DRIVE CONFIGURED TO IMPLEMENT A MEASURE TO PREVENT SLIP OF THE BELT DRIVE AND COMMUNICATE THE MEASURE TO AN OPERATOR

CROSS-REFERENCE TO A RELATED APPLICATION

The invention described and claimed hereinbelow is also described in German Patent Application DE 10 2014 113 008.1, filed on Sep. 10, 2014. The German Patent Application, the subject matters of which is incorporated herein by reference, provides the basis for a claim of priority of invention under 35 U.S.C. 119(a)-(d).

BACKGROUND OF THE INVENTION

The present invention relates to a method for operating a combine harvester comprising a plurality of working assemblies that are driven by at least one belt drive and a ground drive, wherein the at least one belt drive and the ground drive are driven by a main drive comprising an engine.

A method for operating a combine harvester is known from EP 1 740 434 B1. According to the method described in EP 1 740 434 B1, the development of a crop blockage at a threshing-separating rotor is detected. To this end, the result of the measurement of an actual motor speed of a hydraulic motor and the measurement of a motor speed of an engine, which jointly drive the threshing-separating rotor, and the measurement of the speed of the threshing-separating rotor are combined with one another. The combination of the measured engine speed and the measured rotor speed are used to calculate a hydraulic motor speed, which is compared with the measured hydraulic motor speed. If the comparison reveals that a crop blockage is forthcoming, the threshing-separating rotor is decoupled from the hydraulic motor driving this threshing-separating rotor, and from the engine. In addition, the drive of a feed device is decoupled in order to prevent the subsequent delivery of additional crop.

The method according to EP 1 749 434 B1 presumes that a forthcoming crop blockage in the threshing-separating rotor can be determined in such a timely manner that the threshing-separating rotor can automatically remedy the situation, which presumes that the threshing-separating rotor is provided with sufficient time to handle the situation and that no more crop is fed to the threshing-separating rotor during this time. The time period to be calculated for this purpose has a two-fold effect on the operation of the combine harvester. On the one hand, the harvesting process per se is interrupted and, on the other hand, the combine harvester continues to travel, during this time, over the field to be harvested, although without picking up crop, since the feed device is decoupled from the drive thereof during this time period. Therefore, not only is there a loss of production, but harvesting losses also occur and must be accepted, regardless of the result of the handling of the crop blockage. An operator does not realize the situation until the moment when a corresponding control device has already implemented the intended measures to eliminate a forthcoming crop blockage.

SUMMARY OF THE INVENTION

The present invention overcomes the shortcomings of known arts, such as those mentioned above.

To that end, the present invention provides a method for operating a combine harvester, which supports an operator such that the operator can react appropriately to an overload situation, and a combine harvester configured to carry out the method.

In an embodiment, the invention provides a method for operating a combine harvester with a plurality of working mechanisms that are driven by at least one belt drive and a ground drive, the at least one belt drive and the ground drive themselves driven by a main drive comprising an engine. The working mechanisms are monitored by sensors with respect to an occurrence of slip in the at least one belt drive. The signals representing slip are transmitted to a control device of the combine harvester, which is connected to an input/output unit, in order to be evaluated by a communication means. The signals representing the slip are evaluated by the control device and the result is weighted. Depending on the weighting of the result, at least one measure is initiated by the control device, which results in a reduction of the slip, and the at least one initiated measure is signalled by the input/output unit.

The method is advantageous, including that the operator is notified when an overload situation occurs and receives information regarding which measure was initiated in order to eliminate the overload situation or at least to reduce the effects thereof. The operator, therefore, is given the opportunity to operate the combine harvester with the highest possible load and a minimized risk of loss due to a working assembly becoming plugged.

If an overload situation is detected and corresponding measures initiated in response to this detection, the operator, having knowledge of the measure that was carried out, can adjust the selected machine settings such that the overload situation does not occur again. The method reduces the danger that one or more of the working mechanisms of the combine harvester will become plugged by an excessive amount of crop that was picked up. In addition, the method offers a guard against a plugging of the working mechanisms due to reduced friction at the at least one belt drive, e.g., as a result of insufficient belt tension or due to wear on belt surfaces.

Preferably, a sensitivity of the response to slip that occurs is predefined by an input via the input/output unit. In this manner, the operator is given the opportunity to directly influence the operation of the combine harvester. The sensitivity, which can be set by the operator, can result in a graduation of the response threshold at which the control device reacts to slip being detected in the at least one belt drive.

Advantageously, the working mechanism that is responsible for the initiation of a measure due to the slip that occurred can be displayed on the input/output unit. This makes it easier for the operator to identify the working assembly responsible for the slip and to adjust the operating parameters of the affected working mechanism in order to avoid the occurrence of another overload situation.

In particular, when a limit value for the slip is passed, the drive of at least one working assembly of the combine harvester arranged upstream and/or downstream of the working assembly is at least temporarily interrupted. By shutting off the drive of at least one upstream and/or downstream working assembly, it is possible to prevent further crop from being picked up by the combine harvester, which can result in further pluggings in the upstream working process. Preferably, it is provided that the frequency at which the limit value is passed is detected within a defined time interval. It is thereby possible to prevent the monitoring from responding too often. On the other hand, when downstream working assemblies are shut off, additional power is released, which is made available for eliminating a forthcoming plugging at a working assembly. An example thereof is the interruption of a transfer process during the continued harvesting process, in which the contents are transferred from the grain tank of the combine harvester to a trailer. The monitoring is based on a first limit value for the slip, the limit value being representative of a development of a plugging.

In this connection, the duration of the shut-off of the at least one working assembly is monitored by the control device. As a result, a duration of the interruption that represents a substantial interruption of crop flow is ensured. In this manner, the working assembly affected by the slip is given time to automatically eliminate the cause of the slip.

In addition, the main drive can be shut off after the at least one working assembly has been shut off and a limit value for the slip has been passed. By this measure, after a limit value for the slip has been passed for longer than a predefinable length of time, the shut off of the main drive is initiated, provided an overload situation of the working assembly was previously detected during the monitoring. This is based on a second limit value, which deviates substantially upward from the first limit value. The purpose of this measure is to prevent damage in the drive train. As an alternative to the monitoring of the slip, speed monitoring is also carried out. A speed threshold is defined for this purpose, wherein, when the speed falls below this threshold, it is determined that at least one working assembly has come to a standstill.

Preferably, after the main drive is switched on, the speed of all working assemblies is monitored and, if a speed is detected that is lower than a standstill speed, at least one working assembly of the main drive is shut off. The measure of shutting off the main drive functions protects drive elements, such as belts, couplings, bearings, or shafts when at least one of the monitored working assemblies is at a standstill. In this manner, the situation is accounted for in which an operator cannot see the belt drives, which are arranged on the side, for driving the working assemblies from his perspective in the cab of the combine harvester. Therefore, there is a time delay before the operator can determine whether all working assemblies are rotating freely. If the main drive is shut off too late when the belt is slipping, the belt surface incurs thermal damage. The monitoring carried out when the main drive is switched on makes it possible to react immediately, e.g., after at least one working assembly has been cleared, whereby the danger of such damage is minimized. The activation of the monitoring of the speed of all working assemblies can take place after a manual standstill, which has been induced by an operator, or after an automatically generated shut off of the main drive after a limit value for the slip has been passed.

To this end, the monitoring of the speed after the main drive is shut off is activated if the main drive was shut off as a result of a limit value for the slip being passed.

In addition, the monitoring of the speed after the main drive is shut off can be transferred to a standby mode if the monitoring of the speed of the at least one working assembly detects a speed that is exceeding the standstill speed for the duration of a definable time interval. The monitoring of the speed after the main drive is shut off can be activated automatically, i.e., a switch from the standby mode into a monitoring mode is completed when a standstill is detected again. The monitoring of the occurrence of slip at at least one working assembly and the occurrence of a standstill of at least one working assembly remains active independently thereof.

In particular, the monitoring of the speed of all working assemblies can be activated with time offset relative to the switching on of the main drive. By switching on the monitoring of the speed of all working assemblies, it is ensured that the monitoring does not set in until the main drive is switched on and a coupling is switched on. The detection of a speed of a working assembly above the standstill speed is evaluated in order to detect that a coupling has been switched on. In particular, a plurality of working assemblies can be combined to form one speed group if these are shifted jointly via one coupling. The coupling can be designed as a jockey pulley having a corresponding tensioning device.

Preferably, the slip is monitored during the rpm adjustment of one of the working assemblies. Speed changes for one or more working assemblies take place over the course of the adaptation to different harvesting conditions. This may relate to adaptations carried out in the on-going harvesting process or changes carried out during an adjustment process at the beginning of the harvesting process, which is automated or is carried out by the operator.

The adjustment speed is detected during the rpm adjustment. To this end, the change in the adjustment speed of a belt variator is monitored. A comparison with a known set adjustment speed is carried out for this purpose. A deviation from the set adjustment speed by a predefinable amount is an indication of an occurrence of slip over the course of a speed decrease.

In order to monitor the slip during the rpm adjustment, it is possible to differentiate between an adjustment of the speed during idling and a working operation. During idling, the transmission ratio is implemented as an idling gear ratio. During the working operation, the idling gear ratio is continuously corrected by filtering out the smallest speed difference between drive and drive take-off.

Preferably, the signal representing the slip can be derived from a difference between a set speed and an actual speed of the respective working assembly.

Advantageously, the set speed can be readjusted. The readjustment of the set speed is used to balance fluctuations in the transmission ratio, which can set in with hydraulically operated variators for rpm adjustment as a result of temperature fluctuations or oil leaks.

The invention also includes a combine harvester that comprises a plurality of working assemblies driven by a belt drive, a ground drive, and a main drive designed as an engine for driving the belt drives and the ground drive, wherein a control device carries out the inventive method described herein.

BRIEF DESCRIPTION OF THE DRAWINGS

Further features and advantages of the invention will become apparent from the description of embodiments that follows, with reference to the attached figures, wherein.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
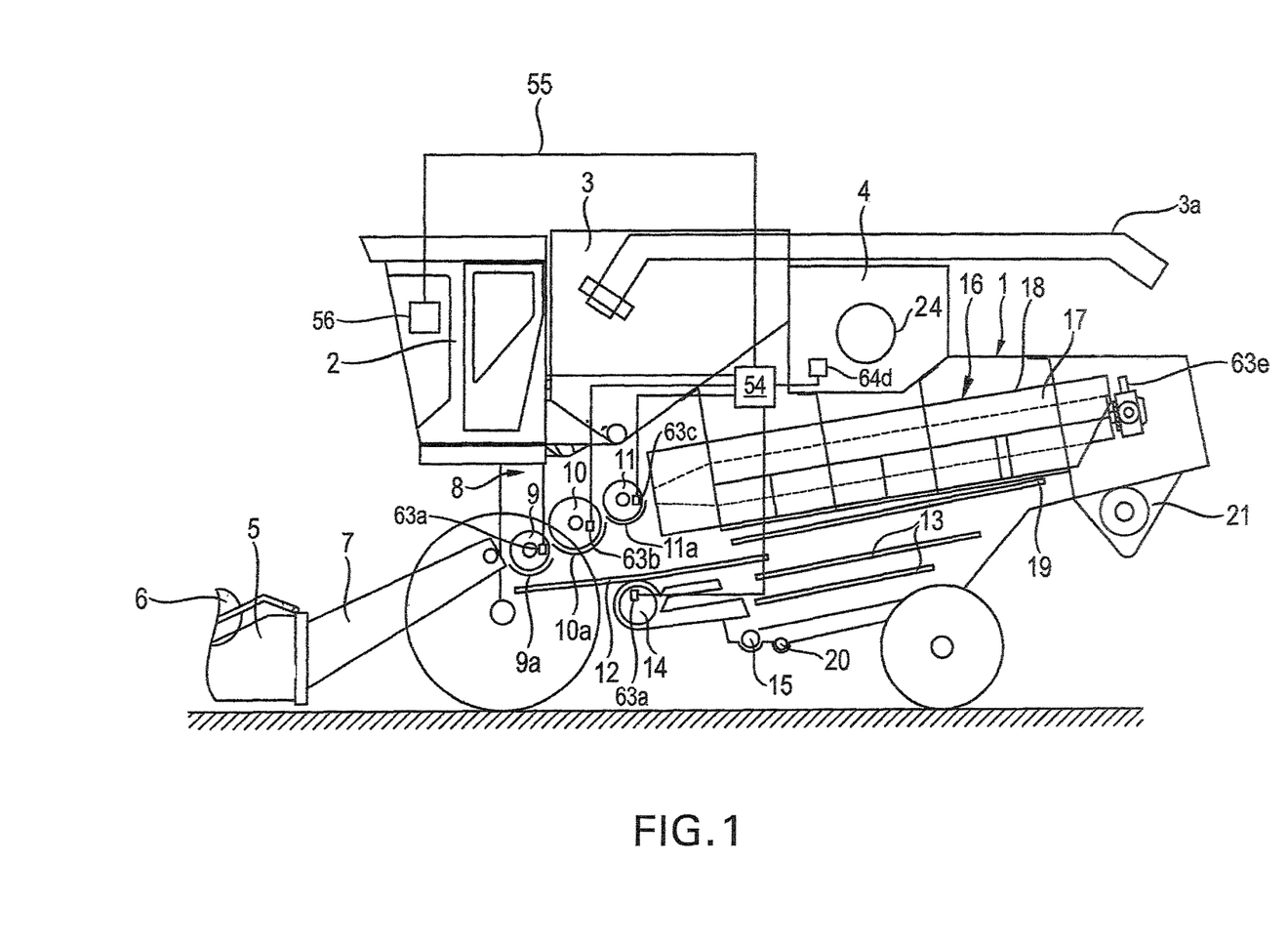
FIG. 1 presents a schematic side view of a self-propelled combine harvester with a partial longitudinal sectional view through the threshing and separating equipment, the cleaning device and the device for residual grain separation.

In FIG. 1, a self-propelled combine harvester 1 is shown to include a driver's cab 2, a grain tank 3 arranged behind the driver's cab and adjacent thereto, an engine 4 having a main drive pulley 24 as the main drive. The main drive pulley 24 can be decoupled from the engine in terms of driving action by a coupling. The engine 4 is assigned an rpm sensor 64d, which detects the output speed of the engine 4 at the main drive pulley. An input/output unit 56 is arranged in the driver's cab 2 and is connected to a control device 54 via a bidirectional communication line 55, which will be addressed in greater detail in FIG. 3. In addition, the self-propelled combine harvester 1 accommodates, in the front region thereof, a front harvesting attachment 5, which is shown only in part and is embodied as a grain or canola header attachment. A corn header can also be used as the front harvesting attachment 5, which captures the corn stalks and separates the corn cobs from the corn stalks by means of a picking device.

This front harvesting attachment 5 captures the stalk crop to be harvested by a reel 6 and severs this stalk crop close to the ground by a (non-illustrated) mower, whereupon the crop is fed from the front harvesting attachment 5 to threshing and separating equipment 8 by a slope conveyor 7. This threshing and separating equipment 8 is embodied as a multi-drum arrangement of a tangential threshing mechanism and comprises an accelerator drum 9, a threshing drum 10, and an impeller 11. Separation concaves 9a and 10a and 11a are associated with the accelerator drum 9 and the threshing drum 10 and impeller 11. The harvested grain or crop travels through the separation concaves 9a and 10a and reach a grain pan 12, via which this grain or crop is fed to swinging sieves of a cleaning device 13. A cleaning fan 14 cooperates with the cleaning device 13, wherein this cleaning fan generates an air flow in the region of the sieves, by which chaff and broken straw are moved out of the combine harvester 1. The grain or crop passing through the sieves of the cleaning device 13 reach a grain-delivery auger 15, which transports this grain or crop to a (non-illustrated) grain elevator connected to the grain tank 3. A grain tank unloading tube 3a is provided for unloading the grain tank 3, by which the grain can be unloaded onto a forage wagon.

All portions of the stalk crop that do not pass through the separation concaves 9a and 10a in the direction of the grain pan 12 and which comprise straw, broken straw, ears and, possibly, awns, are fed by the impeller 11 of a separating device 16 to residual grain separation. This separating device 16 for residual grain separation comprises, in the case of the combine harvester 1 depicted in FIG. 1, a drum-type conveying mechanism 17 extending in the longitudinal direction of the combine harvester, which is also referred to as a separating rotor and comprises conveyor elements, which extend in a helical shape on the radial circumference thereof and are not shown in detail.

The drum-type conveying mechanism 17 is furthermore radially enclosed by a separating housing 18, which comprises (non-illustrated) separating openings in the lower region thereof and is closed, i.e., is impermeable, in the upper region. Residual grain, chaff, ears and, possibly, broken straw pass through the aforementioned openings of the separating housing 18 and reach a return pan 19, which feeds these components to the cleaning device 13. The components of this crop stream that are separated out by the sieves of the cleaning device 13, such as non-threshed out ears, for example, reach a conveyor auger 20, which feeds these components of the crop to non-illustrated tailings. The tailings conveys these components of the crop back into the threshing and separating equipment 8. The straw conveyed through the separating housing 18 exits this separating housing at the rear end thereof, where the straw enters a straw chopper 21.

The front harvesting attachment 5, the slope conveyor 7, the threshing and separating equipment 8, the cleaning device 13, the separating device 16, and the straw chopper 21 are referred to in general as working assemblies of the combine harvester 1. The working assemblies comprise different actuating elements, by which the respective working assembly can be put into operation or taken out of operation, e.g., a coupling, a solenoid valve, a hydraulic cylinder, or the like.

As is evident in the depiction in FIG. 1, at least the accelerator drum 9, the threshing drum 19, the impeller 11, the cleaning fan 14, and the conveying mechanism 17 of the separating device 16 each comprise a working assembly rpm sensor 63a, 63b, 63c, 63d, 63e, by which the respective output speed of these working assemblies is detected.

Figure 2:
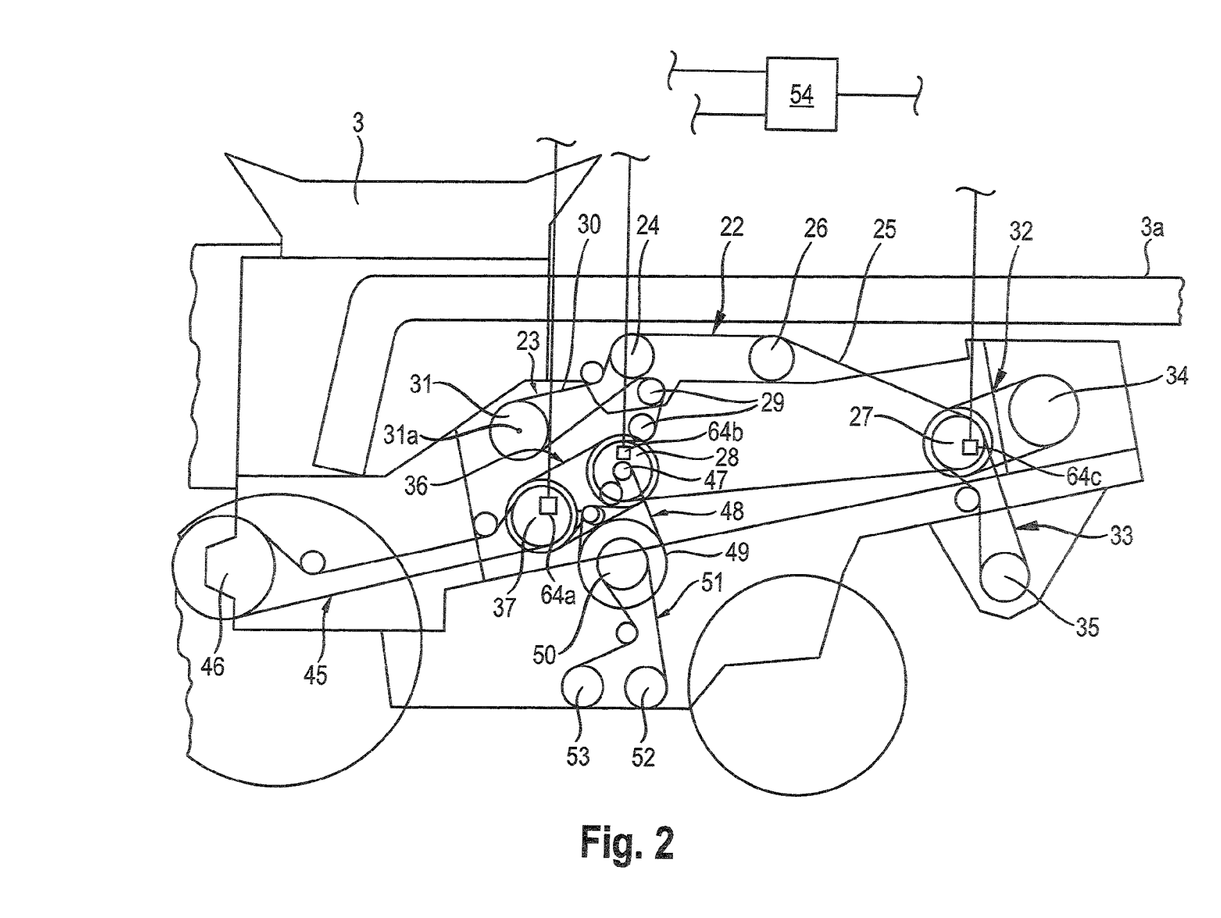
FIG. 2 presents a schematic view of a drive system of the self-propelled combine harvester.

FIG. 2 shows an embodiment of a drive system for a combine harvester 1 designed as per FIG. 1, wherein this is the part of the drive system located on the left side as viewed in the direction of travel of the combine harvester 1.

The drive system consists of a first main belt drive 22 and a second main belt drive 23. The first main belt drive 22 and the second main belt drive 23 are driven by a main drive pulley 24, which is set into rotation by the engine 4. The first main belt drive 22 comprises a first compound poly V-belt 25, which is guided via a driven pulley 26 of a transfer pump, a first intermediate drive stage 27, and a second intermediate drive stage 28. In addition, the first compound poly V-belt 25 is tensioned via a tensioning system 29. In addition, a second compound poly V-belt 30 extends from the main pulley 24 to a driven pulley 31 arranged on an auxiliary PTO stub 31a.

FIG. 2 shows that the first compound poly V-belt 25 is engaged with the first intermediate drive stage 27, which is provided to drive the separating device 16 for residual grain separation and the straw chopper 21, and with the second intermediate drive stage 28, which is used to drive the front harvesting attachment 5 and the cleaning device 13. The first intermediate drive stage 27, which is rotatably arranged on the machine frame of the combine harvester 1, is connected to a section for the output of the first compound poly V-belt 25 and to sections for driving a first belt drive 32, which leads to the separating device 16 for residual grain separation, and is connected to a second belt drive 33, which leads to the straw chopper 21. The first belt drive 32 comprises a driven pulley 34 of the separating device 16 for residual grain separation, while a driven pulley 35 connected to the straw chopper 21 is a component of the second belt drive 33.

A third belt drive 36 extends from the second intermediate drive stage 28 to a third intermediate drive stage 37, which, similar to the first and the second intermediate drive stage 27 and 28, respectively, form an interconnection of a plurality of pulleys which are non-rotatably interconnected and are rotatably mounted on the machine frame of the combine harvester 1.

The third intermediate drive stage 37 drives, by a fourth belt drive 45, a driven pulley 46 connected to the front harvesting attachment 5. Moreover, a fifth belt drive 48 proceeds from an output 47 of the second intermediate drive stage 28 and is engaged with a driven pulley 49 connected to the cleaning device 13. A drive pulley 50 proceeds from this driven pulley 49 and is connected via a sixth belt drive 51 to driven pulleys 52 and 53 for the grain-delivery auger 15 and the conveyor auger 20.

The first intermediate drive stage 27, the second intermediate drive stage 28, and the third intermediate drive stage 37 each have a drive rpm sensor 64a, 64b, 64c, by which the respective drive speed of the first intermediate drive stage 27, the second intermediate drive stage 28 and the third intermediate drive stage 37, which are referred to in general as drive devices, is detected.

Figure 3:
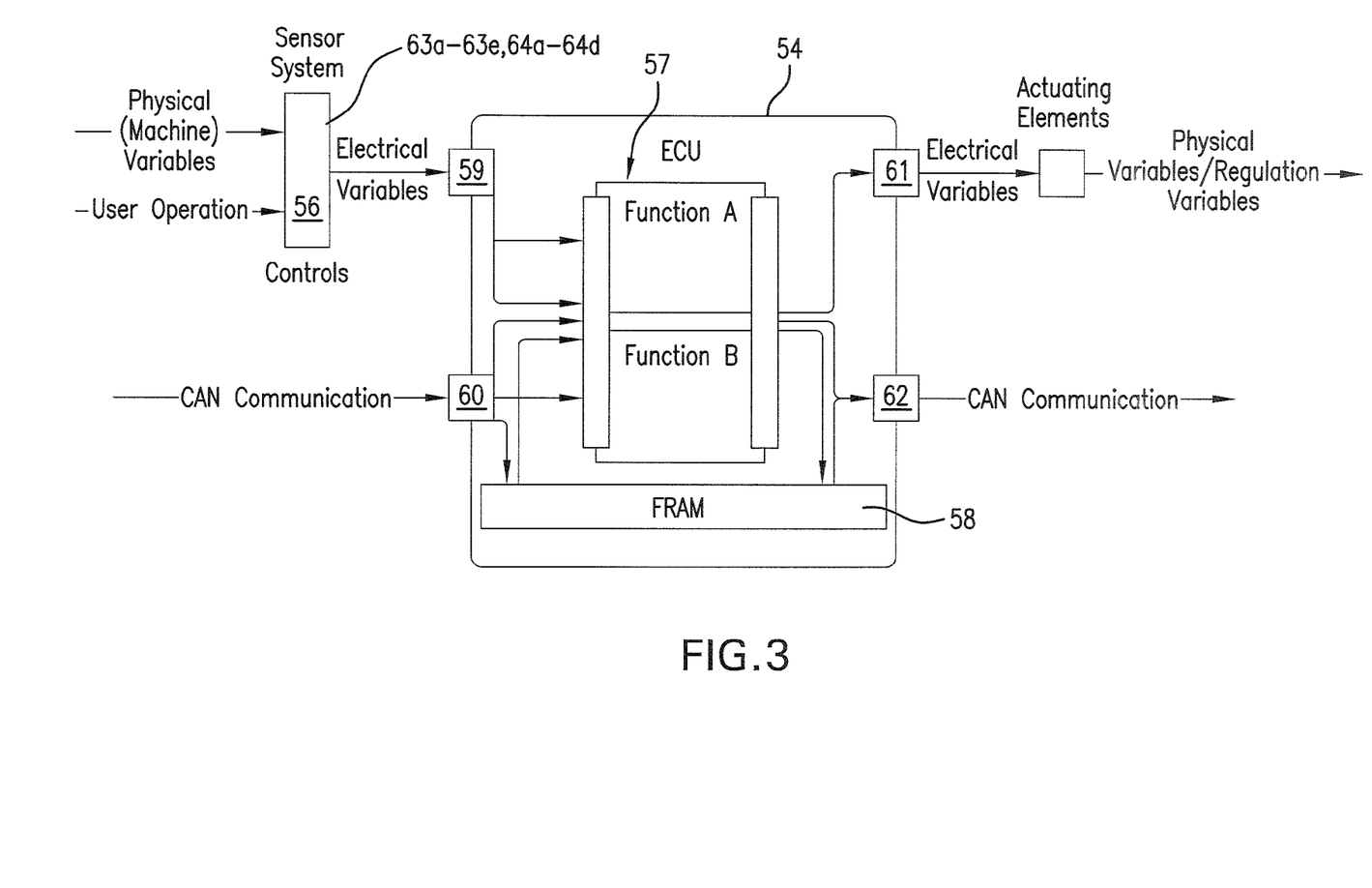
FIG. 3 presents a schematic view of a control device for the self-propelled combine harvester.

The depiction in FIG. 3 shows a schematic view of the control device 54. The control device 54 comprises at least one processor unit 57 for processing program code and a non-volatile memory 58, as well as a plurality of input/output interfaces. An IO input interface 59 is used to transfer the rpm signals transmitted via supply leads from the respective working assembly rpm sensor 63a to 63e or drive rpm sensors 64a to 64d to the control device 54, through input/output unit 56. In addition, the IO input interface 59 receives signals for the control device 54 that are input by an operator in the driver's cab 2 through the input/output unit 56.

Another interface is formed by a CAN input interface 60, by which the signals transmitted by a CAN bus system of the combine harvester 1, such as the speed of the engine 4 or the main drive pulley 24, as well as the statuses as to whether a monitoring process is active are provided to the control device. The actuating elements of the working assemblies of the combine harvester 1 are activated by the IO output interface 61. For example, the drive of the front harvesting attachment 5 or the grain tank unloading tube 3a can be interrupted. There is also a CAN output interface 62, by which control and/or status signals are transmitted to the CAN bus system. For example, the ground speed of the combine harvester 1 is modified by a control signal, which is output by the control device 54 via the CAN output interface 62.

The method monitors and reacts to overload situations, which can result from crop flow problems of the combine harvester 1. The method is intended to make it possible to operate the combine harvester 1 as close as possible to the load or power limit thereof, wherein the risk of failure is held as low as possible. The intention is to reduce or, possibly, entirely prevent the time required to clear a plugged combine harvester 1.

Figure 4:
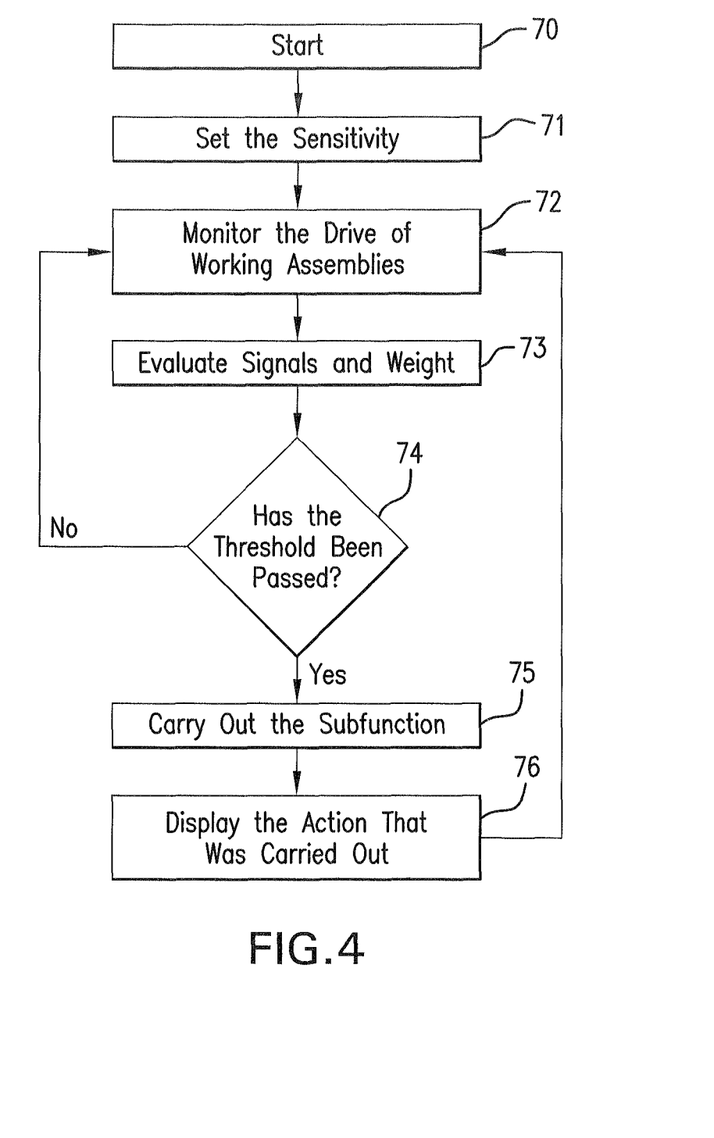
FIG. 4 presents a flow chart for illustrating a method for operating a self-propelled combine harvester 1.

The depiction in FIG. 4 shows a flow chart, which illustrates the method for operating the combine harvester 1 according to the inventive principles. Reference number 70 indicates the start of the process, as the first method step, which can be carried out manually by the operator. As an alternative, it is conceivable that the process is activated automatically, e.g., by the threshing and separating equipment 8 being put into operation. Reference number 71 refers to a method step that enables the operator to preset a sensitivity that defines the sensitivity of the response to an overload situation. In a simple case, the sensitivity of the response is set by the operator, who can differentiate between the requirements "low", "medium", and "high". Corresponding default values for the requirements "low", "medium", and "high" made available to the operator are stored in the non-volatile memory 58 so as to be retrievable. The selection of the sensitivity is intended to express the safety needs of the operator regarding the amount of slip that is allowable, from the operator's perspective, before an overload situation is detected by the control device 54. It also is conceivable that relative values for a response to an overload situation can be entered or selected.

Reference number 72 refers to the method step of initiating the monitoring of the drives of the working assemblies. For monitoring purposes, actual rpm values are fed to the control device 54 via the IO input interface 59 from the rpm sensors 63a to 63e and 64a to 64c. In a method step labeled with reference number 73, the respective actual rpm signals are evaluated and weighted. The weighting process is explained in greater detail further below. The actual rpm signals are evaluated by comparing the actual rpm signals, which are provided by the working assembly rpm sensors 63a to 63e of the working assemblies, with those delivered by the drive rpm sensors 64a to 64c of the drive devices. On the basis of the difference between these values, which is determined as the result, it is possible to identify an occurrence of slip in one of the belt drives 32, 33.

The result of the evaluation also is weighted in method step 73. The purpose of the weighting is to be able to differentiate between different operating situations that make different measures necessary in order to react appropriately to the occurrence of slip.

A distinction is made between different subfunctions:

An overload guard, in which, when a limit value for the slip is passed, the drive of a working assembly of the combine harvester arranged upstream and/or downstream of the working assembly is at least temporarily interrupted. In particular, the front harvesting attachment 5 and the grain tank unloading tube 3a are shut off, provided a grain-unloading process is active at this time. As a result, the further pick-up of new crop is prevented and losses can be avoided during the transfer process by reducing the ground speed of the combine harvester, since the accompanying vehicle typically has a delayed response to a change in the ground speed of the combine harvester.

A standstill guard, in which the main drive, is shut off after the at least one working assembly has been shut off and a limit value for the slip has been passed, is provided.

A switch-on guard, in which, after the main drive is switched on, the speed of all working mechanisms is monitored and, if a speed is detected that is lower than a standstill speed, at least one working assembly of the main drive is shut off.

In addition to the aforementioned subfunctions, there is a so-called engine guard, in which the engine speed of the drive of at least one working assembly is shut off or interrupted when a limit value is passed. The engine guard functions independently of the monitoring of the working assemblies in terms of the occurrence of slip.

The "overload guard" and "standstill guard" subfunctions are active independently of the "switch-on guard" and/or "engine guard" subfunctions.

In method step 74 a check is carried out to determine whether one of many defined thresholds for slip has been passed. The various thresholds for slip are stored in the non-volatile memory 58. Depending on the setting for sensitivity selected by the operator in method step 71, specific thresholds for the respective subfunction are read out of the memory 58 and are made available to the processor unit 57 for checking in method step 74. If the specific threshold is not passed in method step 74, the monitoring as per method step 72 is continued. If it is determined that the specific threshold has been passed, then, as per method step 75, a subfunction corresponding to the specific threshold is invoked and at least one measure stored therein is automatically carried out.

Following method step 75, in a method step 76, the at least one automatically executed measure is displayed to the operator on the input/output unit 56. Monitoring is then typically continued with method step 72.

The at least one automatically executed measure is based on the subfunction from which this is invoked.

The "overload guard" subfunction reacts to the occurrence of slip to an extent that indicates an overload situation caused by an existing or developing plugging in the combine harvester 1. In this case, a measure is that of temporarily interrupting the drive of a working assembly of the combine harvester arranged upstream or downstream of the working assembly. For example, the front harvesting attachment can be decoupled on the drive side and/or actively braked when the occurrence of slip is detected at the threshing drum. Another measure that can be carried out alone or in combination with the aforementioned measures is the reduction of the ground speed. As an alternative or in addition to one of the aforementioned measures, an interruption of the grain tank unloading process can be carried out by automatically shutting off the grain tank emptying tube, provided this process is active. The objective is to avoid a plugging or to at least reduce the effects thereof, in order to lower the time required to clear out the combine harvester 1.

The "standstill guard" subfunction searches for a previous detection of an overload situation and the shut-off of a working assembly as the measure that was implemented to reduce slip as per the "overload guard" subfunction. The "standstill guard" subfunction is invoked when it is detected, in method step 74, that a threshold corresponding to this subfunction has been passed. The measure that is implemented when the "standstill guard" subfunction is carried out is that the main drive is shut off by disengaging the coupling of the main drive pulley 24.

The "switch-on guard" subfunction is invoked when the "standstill guard" subfunction was previously carried out and it is determined, on the basis of the slip monitoring, that at least one working assembly is blocked. After the main drive is switched on, the speed of all working assemblies is monitored and, if a speed is detected that is lower than a standstill speed, at least one working assembly of the main drive is shut off. The switch-on guard is active only for a limited period of time. The switch-on guard switches from an active monitoring mode into a standby mode, after at least one working assembly has come to a standstill, when the rpm sensors 63a to 63e and 64a to 64c of the working assemblies once more detect a speed that is higher than the standstill speed. The non-volatile memory 58 temporarily stores information regarding whether a standstill has taken place by the execution of the "standstill guard" subfunction or by a manual shut-off by an operator.

LIST OF REFERENCE NUMBERS 1 combine harvester
2 driver's cab
3 grain tank
3a grain tank unloading tube
4 engine
5 front harvesting attachment
6 reel
7 slope conveyor
8 separating device
9 accelerator drum
9a separation concave
10 threshing drum
10a separation concave
11 impeller
11a separation concave
12 grain pan
13 cleaning device
14 cleaning fan
15 grain-delivery auger
16 separating device
17 conveying mechanism
18 separating housing
19 return pan
20 conveyor auger
21 straw chopper
22 first main belt drive
23 second main belt drive
24 main drive pulley
25 compound poly V-belt
26 driven pulley
27 first intermediate drive stage
28 second intermediate drive stage
29 tensioning system
30 compound poly V-belt
31 driven pulley
31a auxiliary PTO stub
32 first belt drive
33 second belt drive
34 driven pulley
35 driven pulley
36 third belt drive
37 third intermediate drive stage
45 fourth belt drive
46 driven pulley
47 output drive
48 fifth belt drive
49 driven pulley
50 drive pulley
51 sixth belt drive
52 driven pulley
53 driven pulley
54 control device
55 communication line
56 input/output unit
57 processor unit
58 non-volatile memory
59 IO input interface
60 CAN input interface
61 IO output interface
62 CAN output interface
70 method step
71 method step
63a working assembly rpm sensor
63b working assembly rpm sensor
63c working assembly rpm sensor
63d working assembly rpm sensor
63e working assembly rpm sensor
64a drive rpm sensor
64b drive rpm sensor
64c drive rpm sensor 64d drive rpm sensor
72 method step
73 method step
74 method step
75 method step
76 method step As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A method for operating a combine harvester comprising a plurality of working assemblies, which are driven by at least one belt drive, and a ground drive, wherein the at least one belt drive and the ground drive are driven by a main drive comprising an engine, the method comprising the steps of:
using sensors to monitor the working assemblies for indications of occurrence of slip in the at least one belt drive and to generate sensor signals representative of the monitoring;
transmitting the sensor signals to a control device of the combine harvester;
evaluating the sensor signals by the control device and based on the evaluating, weighting an evaluation result;
depending on the weighting of the evaluation result, initiating at least one measure by the control device, to reduce slip; and
communicating the at least one initiated measure, and an identity of one of the plurality of working assemblies that is responsible for the initiation of the measure, to an input/output unit connected to the control device, for display to an operator of the combine harvester.

2. The method according to claim 1, wherein a sensitivity of the measure initiated to reduce slip is predefined by an input via the input/output unit.

3. The method according to claim 1, wherein a slip is determined when a limit value defined for one of the plurality of working assemblies is exceeded and wherein in a case where a slip associated with one of the working assemblies is determined, a drive of at least one of the working assemblies of the combine harvester arranged upstream and/or downstream of said one working assembly is at least temporarily interrupted.

4. The method according to claim 3, wherein a duration of the at least temporary interruption is monitored by the control device.

5. The method according to claim 3, wherein the main drive is shut off after the at least one working assembly has been at least temporarily interrupted and a limit value for the slip has been passed.

6. The method according to claim 1, wherein after the main drive is switched on, a speed of all of the working assemblies is monitored and, if a speed is detected that is lower than a standstill speed, at least one working assembly of the main drive is shut off.

7. The method according to claim 6, wherein the monitoring of the speed after the main drive is shut off is activated if the main drive was shut off as a result of a limit value for the slip being passed.

8. The method according to claim 7, wherein the monitoring is deactivated if the monitoring of the speed of the at least one working assembly detects a speed that is located above the standstill speed for the duration of a definable time interval.

9. The method according to claim 6, wherein the monitoring of the speed of all working assemblies is activated with time offset relative to the switching on of the main drive.

10. The method according to claim 1, wherein the slip is monitored during an rpm adjustment of one of the working assemblies.

11. The method according to claim 10, wherein an adjustment speed is detected during the rpm adjustment.

12. The method according to claim 10, wherein in order to monitor the slip during the rpm adjustment, a differentiation between an adjustment of the speed during idling and a working operation is carried out.

13. The method according to claim 1, wherein the signal representing the slip is derived from a difference between a set speed and an actual speed of the respective working assemblies.

14. The method according to claim 13, wherein the set speed is readjusted.

15. A combine harvester comprising a plurality of working assemblies driven by at least one belt drive, a ground drive, a main drive having an engine for driving the at least one belt drive and the ground drive, a control device and an input/output unit, wherein the control device executes a method comprising the steps of:
using sensors to monitor the working assemblies for indications of occurrence of slip in the at least one belt drive and to generate sensor signals representative of the monitoring;
transmitting the sensor signals to the control device;
evaluating the sensor signals by the control device and based on the evaluating, weighting an evaluation result;
depending on the weighting of the evaluation result, initiating at least one measure by the control device, to reduce slip; and
communicating the at least one initiated measure, and an identity of one of the plurality of working assemblies that is responsible for the initiation of the measure, to the input/output unit connected to the control device, for display to an operator of the combine harvester.

* * * * *